(12) United States Patent
Cmielowski et al.

(10) Patent No.: US 11,461,648 B2
(45) Date of Patent: Oct. 4, 2022

(54) STANDARDIZING DISPARATE DATA POINTS

(71) Applicant: International Business Machines Corporation, Armonk, NY (US)

(72) Inventors: Lukasz G. Cmielowski, Cracow (PL); Maksymilian Erazmus, Zasow (PL); Rafal Bigaj, Cracow (PL); Wojciech Sobala, Cracow (PL)

(73) Assignee: International Business Machines Corporation, Armonk, NY (US)

(*) Notice: Subject to any disclaimer, the term of this patent is extended or adjusted under 35 U.S.C. 154(b) by 371 days.

(21) Appl. No.: 16/808,428

(22) Filed: Mar. 4, 2020

(65) Prior Publication Data

US 2021/0279562 A1 Sep. 9, 2021

(51) Int. Cl.
*G06N 3/04* (2006.01)
*G06F 16/9032* (2019.01)
(Continued)

(52) U.S. Cl.
CPC ............ *G06N 3/08* (2013.01); *G06F 11/3688* (2013.01); *G06F 16/9538* (2019.01); *G06N 3/04* (2013.01); *G06F 11/3447* (2013.01); *G06F 16/137* (2019.01); *G06F 16/2365* (2019.01); *G06F 16/335* (2019.01); *G06N 3/0445* (2013.01); *G06N 3/0454* (2013.01); *G06N 3/0481* (2013.01)

(58) Field of Classification Search
CPC .......... G06N 3/08; G06N 3/04; G06N 3/0454; G06N 3/0445; G06N 3/0481; G06N 3/02; G06N 3/088; G06F 16/9538; G06F 16/137; G06F 16/215; G06F 16/2365; G06F 16/26; G06F 16/335; G06F 16/16; G06F 16/18; G06F 16/9035; G06F 11/3688; G06F 11/3616; G06F 11/3447
See application file for complete search history.

(56) References Cited

U.S. PATENT DOCUMENTS 10,452,992 B2  10/2019  Lee
10,685,295 B1*  6/2020  Ross ..................... G06N 20/00
(Continued)

OTHER PUBLICATIONS

Emanuele Di Buccio et al., Binary Classification Model Inspired from Quantum Detection Theory, Sep. 14-17, 2018, [Retrieved on Jul. 11, 2022]. Retrieved from the internet: <URL: https://dl.acm.org/doi/pdf/10.1145/3234944.3234979> 4 pp. 187-190 (Year: 2018).*

*Primary Examiner* — Anibal Rivera
(74) *Attorney, Agent, or Firm* — Randy Tejeda

(57) ABSTRACT

In an approach to deploying a test input based on standardized disparate data points, one or more computer processors perform one or more tests on a test input resulting in one or more disparate data points that are either non-binary or binary. The one or more computer processors standardize the one or more disparate data points utilizing a trained binary classification model. The one or more computer processors generate one or more non-binary machine learning evaluation metrics based on the one or more standardized disparate data points. The one or more computer processors, responsive to the one or more generated non-binary machine learning evaluation metrics exceeding one or more thresholds, deploy the test input.

20 Claims, 3 Drawing Sheets

(51) Int. Cl.
*G06N 3/08*    (2006.01)
*G06F 16/9538*    (2019.01)
*G06F 11/36*    (2006.01)
G06F 16/335    (2019.01)
G06F 11/34    (2006.01)
G06F 16/23    (2019.01)
G06F 16/13    (2019.01)

(56) References Cited

U.S. PATENT DOCUMENTS

| | | |
|---|---|---|
| 2012/0158623 A1 | 6/2012 | Bilenko |
| 2015/0242761 A1 | 8/2015 | Amershi |
| 2019/0129398 A1 | 5/2019 | Naito |
| 2019/0147300 A1* | 5/2019 | Bathen .................. G06N 3/084 |
| | | 706/12 |
| 2020/0210882 A1* | 7/2020 | Roberts ................ G06N 3/0454 |
| 2020/0226503 A1* | 7/2020 | Subramanian ........ G06F 16/387 |
| 2020/0265119 A1* | 8/2020 | Desai .................... G06Q 50/06 |
| 2020/0279219 A1* | 9/2020 | Desai ................ G06Q 10/0835 |
| 2020/0349246 A1* | 11/2020 | Budman ................ G06F 21/32 |

\* cited by examiner

STANDARDIZING DISPARATE DATA POINTS

BACKGROUND

The present invention relates generally to the field of machine learning, and more particularly to mixed environment evaluation.

Machine learning (ML) is a scientific study of algorithms and statistical models that computer systems use to perform a specific task without using explicit instructions, relying on patterns and inference instead. Machine learning is a subset of artificial intelligence. Machine learning algorithms build a mathematical model based on sample data, known as training data, in order to make predictions or decisions without being explicitly programmed to perform the task. Machine learning algorithms are used in a wide variety of applications, such as email filtering and computer vision, where it is difficult or infeasible to develop a conventional algorithm for effectively performing the task.

SUMMARY

Embodiments of the present invention disclose a computer-implemented method, a computer program product, and a system for deploying a test input based on standardized disparate data points. The computer-implemented method includes one or more computer processors performing one or more tests on a test input resulting in one or more disparate data points that are either non-binary or binary. The one or more computer processors standardize the one or more disparate data points utilizing a trained binary classification model. The one or more computer processors generate one or more non-binary machine learning evaluation metrics based on the one or more standardized disparate data points. The one or more computer processors, responsive to the one or more generated non-binary machine learning evaluation metrics exceeding one or more thresholds, deploy the test input.

DETAILED DESCRIPTION

Generally, administrators and developers run a plurality of tests, units, reports, suites, and assessments to generate and provide a plurality of results and associated statistics needed to accurately identify an effectiveness of a test input (e.g., model, module, software, application, etc.). Moreover, evaluation metrics are typically calculated based on observations and predictions where both variables are passed to an evaluation method or function. In mixed developmental and production environments, where models and software are integrated into co-dependent functions, modules, and microservices, providing generalized statistics that encompass model performance (e.g., accuracy, precisions, temporal constraints, etc.) and application effectiveness is an important, yet increasingly difficult task. Embodiments of the present invention allow for a conversion of binary test results into non-binary machine learning evaluation metrics. Embodiments of the present invention provide a plurality of evaluation metrics encompassing a large set of converted binary metrics. Embodiments of the present invention automatically deploy one or models and/or one or more associated applications based on one or more created non-binary machine learning evaluation metrics. Implementation of embodiments of the invention may take a variety of forms, and exemplary implementation details are discussed subsequently with reference to the Figures.

The present invention will now be described in detail with reference to the Figures.

Figure 1:
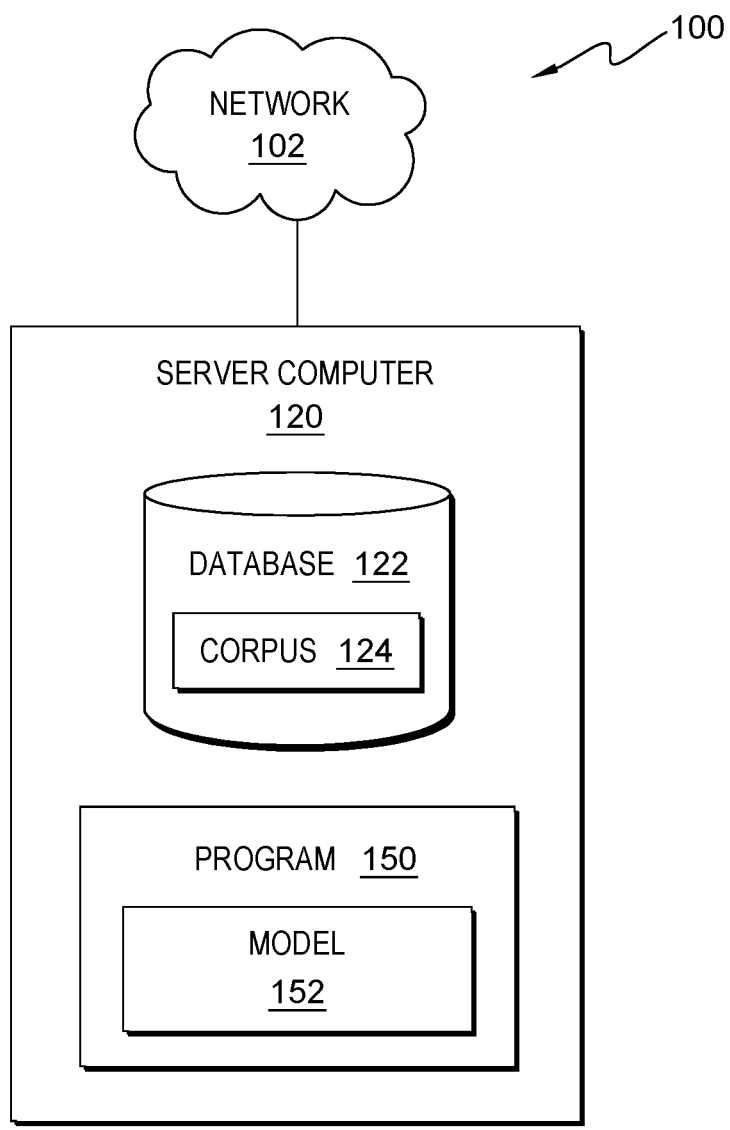
FIG. 1 is a functional block diagram illustrating a computational environment, in accordance with an embodiment of the present invention.

FIG. 1 is a functional block diagram illustrating a computational environment, generally designated 100, in accordance with one embodiment of the present invention. The term "computational" as used in this specification describes a computer system that includes multiple, physically, distinct devices that operate together as a single computer system. FIG. 1 provides only an illustration of one implementation and does not imply any limitations with regard to the environments in which different embodiments may be implemented. Many modifications to the depicted environment may be made by those skilled in the art without departing from the scope of the invention as recited by the claims.

Computational environment 100 includes server computer 120 connected over network 102. Network 102 can be, for example, a telecommunications network, a local area network (LAN), a wide area network (WAN), such as the Internet, or a combination of the three, and can include wired, wireless, or fiber optic connections. Network 102 can include one or more wired and/or wireless networks that are capable of receiving and transmitting data, voice, and/or video signals, including multimedia signals that include voice, data, and video information. In general, network 102 can be any combination of connections and protocols that will support communications between server computer 120 and other computing devices (not shown) within computational environment 100. In various embodiments, network 102 operates locally via wired, wireless, or optical connections and can be any combination of connections and protocols (e.g., personal area network (PAN), near field communication (NFC), laser, infrared, ultrasonic, etc.).

Server computer 120 can be a standalone computing device, a management server, a web server, a mobile computing device, or any other electronic device or computing system capable of receiving, sending, and processing data. In other embodiments, server computer 120 can represent a server computing system utilizing multiple computers as a server system, such as in a cloud computing environment. In another embodiment, server computer 120 can be a laptop computer, a tablet computer, a netbook computer, a personal computer (PC), a desktop computer, a personal digital assistant (PDA), a smart phone, or any programmable electronic device capable of communicating with other computing devices (not shown) within computational environment 100 via network 102. In another embodiment, server computer 120 represents a computing system utilizing clustered computers and components (e.g., database server computers, application server computers, etc.) that act as a single pool of seamless resources when accessed within computational environment 100. In the depicted embodiment, server computer 120 includes database 122 and program 150. In other embodiments, server computer 120 may contain other applications, databases, programs, etc. which have not been depicted in computational environment 100. Server computer 120 may include internal and external hardware components, as depicted and described in further detail with respect to FIG. 4.

Database 122 is a repository for data used by program 150. In the depicted embodiment, database 122 resides on server computer 120. In another embodiment, database 122 may reside elsewhere within computational environment 100 provided program 150 has access to database 122. A database is an organized collection of data. Database 122 can be implemented with any type of storage device capable of storing data and configuration files that can be accessed and utilized by program 150, such as a database server, a hard disk drive, or a flash memory. In an embodiment, database 122 stores data used by program 150, such as historical deep learning model assessments, statistics, and deployments. In an embodiment, database 122 contains a table containing one or more sets of statistics associated with a test input such as a plurality of test input characteristics and associated system statistics. In an embodiment, database 122 contains data corresponding to a plurality of test input characteristics including, but not limited to, test input (e.g., model) configuration (i.e., number of neurons, number of layers, tensor size, numbers of activations, parameter size, trainable parameters, and non-trainable parameters), test input execution (i.e., CPU utilization, GPU utilization, GPU memory utilization, CPU memory utilization, and number of spawned CPU processes), test input characteristics (i.e., time per iteration, CPU-GPU communication time, GPU compute time, CPU time utilization, scaling efficiency for multiple GPUs, and network latency), and data configuration (i.e., dataset size and data processing time). In an embodiment, system statistics include, but are not limited to, central processing unit (CPU) configurations (i.e., number of CPU cores, number of threads per CPU core, non-uniform memory access (NUMA) nodes, remote memory access latency, memory bandwidth, CPU-GPU link bandwidth/latency, and CPU-CPU interconnection bandwidth/latency) and graphical processing unit (GPU) configurations (i.e., number of GPUs, GPU compute capability (FLOPS), available GPU memory, GPU topology, GPU-GPU link bandwidth, and GPU-GPU link latency). In various embodiments, database 122 contains information regarding success/failure rates for one or more tests and assessments associated with a test input. In the depicted embodiment, database 122 contains corpus 124.

Corpus 124 contains one or more examples, sets of training data, data structures, and/or variables used to fit the parameters of a specified model. The contained data comprises of pairs of input vectors with associated output vectors. In an embodiment, corpus 124 may contain one or more sets of one or more instances of unclassified or classified (e.g., labelled) data, hereinafter referred to as training statements. In another embodiment, the training data contains an array of training statements organized in labelled training sets. For example, a plurality of training sets include "positive" and "negative" labels paired with associated training statements (e.g., words, sentences, etc.). In an embodiment, each training set includes a label and an associated array or set of training statements which can be utilized to train one or more models. In an embodiment, corpus 124 contains unprocessed training data. In an alternative embodiment, corpus 124 contains natural language processed (NLP) (e.g., section filtering, sentence splitting, sentence tokenizer, etc.) feature sets. In a further embodiment, corpus 124 contains vectorized (i.e., one-hot encoding, word embedded, dimension reduced, etc.) training sets, associated training statements, and labels.

Model 152 is representative of a model utilizing machine learning and/or deep learning techniques to train, calculate weights, ingest inputs, and output a plurality of solution vectors. In an embodiment, model 152 is comprised of any combination of deep learning model, technique, and algorithm (e.g., decision trees, Naive Bayes classification, support vector machines for classification problems, random forest for classification and regression, linear regression, least squares regression, logistic regression). In an embodiment, model 152 utilizes transferrable neural networks algorithms and models (e.g., long short-term memory (LSTM), deep stacking network (DSN), deep belief network (DBN), convolutional neural networks (CNN), compound hierarchical deep models, etc.) that can be trained with supervised or unsupervised methods. In the depicted embodiment, model 152 is a recurrent neural network (RNN) trained utilizing supervised training methods. The retrieval or training of model 152 is depicted and described in further detail with respect to FIG. 2.

Program 150 is a program for deploying test inputs based on standardized disparate data points. In various embodiments, program 150 may implement the following steps: perform one or more tests on a test input resulting in one or more disparate data points that are either non-binary or binary; standardize the one or more disparate data points utilizing a trained binary classification model; generate one or more non-binary machine learning evaluation metrics based on the one or more standardized disparate data points; responsive to the one or more generated non-binary machine learning evaluation metrics exceeding one or more thresholds, deploy the test input. In the depicted embodiment, program 150 is a standalone software program. In another embodiment, the functionality of program 150, or any combination programs thereof, may be integrated into a single software program. In some embodiments, program 150 may be located on separate computing devices (not depicted) but can still communicate over network 102. In various embodiments, client versions of program 150 resides on other computing device (not depicted) within computational environment 100. Program 150 is depicted and described in further detail with respect to FIG. 2.

The present invention may contain various accessible data sources, such as database 122 and corpus 124, that may include personal storage devices, data, content, or information the user wishes not to be processed. Processing refers to any, automated or unautomated, operation or set of operations such as collection, recording, organization, structuring, storage, adaptation, alteration, retrieval, consultation, use, disclosure by transmission, dissemination, or otherwise making available, combination, restriction, erasure, or destruction performed on personal data. Program 150 provides informed consent, with notice of the collection of personal data, allowing the user to opt in or opt out of processing personal data. Consent can take several forms. Opt-in consent can impose on the user to take an affirmative action before the personal data is processed. Alternatively, opt-out consent can impose on the user to take an affirmative action to prevent the processing of personal data before the data is processed. Program 150 enables the authorized and secure processing of user information, such as tracking information, as well as personal data, such as personally identifying information or sensitive personal information. Program 150 provides information regarding the personal data and the nature (e.g., type, scope, purpose, duration, etc.) of the processing. Program 150 provides the user with copies of stored personal data. Program 150 allows the correction or completion of incorrect or incomplete personal data. Program 150 allows the immediate deletion of personal data.

Figure 2:
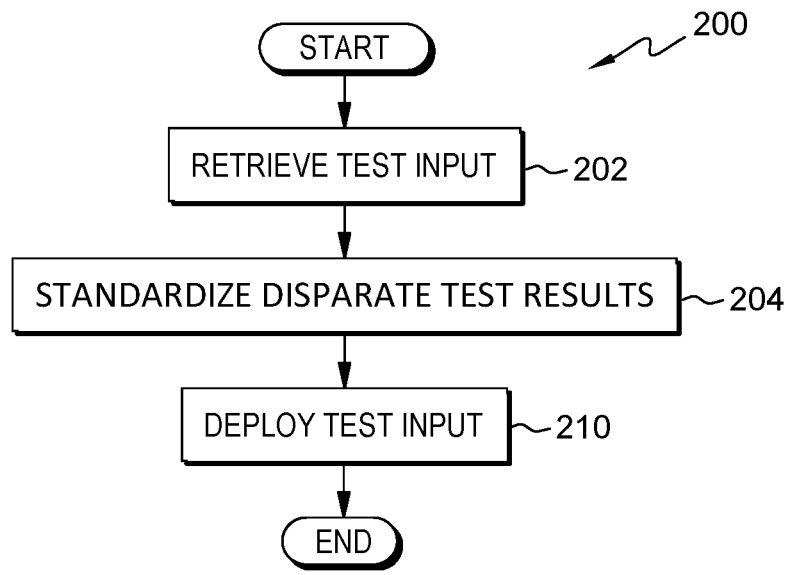
FIG. 2 is a flowchart depicting operational steps of a program, on a server computer within the computational environment of FIG. 1, for deploying a test input based on standardized disparate data points, in accordance with an embodiment of the present invention.

FIG. 2 is a flowchart depicting operational steps of program 150 for deploying a test input based on standardized disparate data points, in accordance with an embodiment of the present invention.

Program 150 retrieves test input (step 202). In an embodiment, a test input is an application. In a further embodiment, the test input utilizes a model for a plurality of outputs. For example, software and associated modules utilize a trained classification model to determine a risk classification for a business and utilize said classification for further calculations or determinations. In an embodiment, program 150 retrieves one or more test inputs (e.g., programs, applications, software, modules, etc.) from one or more code repositories (e.g., software versioning and revision control systems, etc.) or production environments. In another embodiment, a user inputs (e.g., imports) a test input into program 150. In various embodiments, a test input is a model (e.g., deep learning) utilizing machine learning techniques. In an embodiment, program 150 maintains one or more sets of models (e.g., model 152) utilizing machine learning techniques and deep learning structures and/or architectures (e.g., deep Boltzmann machines, deep convolutional networks, etc.). Program 150 trains model 152 by utilizing a plurality of training methods (e.g., supervised, unsupervised, etc.) based on the constructed feature vectors contained in corpus 124. In an embodiment, program 150 trains model 152 with a plurality of feature vectors originating from the sets extracted from the training data and associated label located in corpus 124. In this embodiment, program 150 determines appropriate training methods dependent on the model type of model 152. For example, if the model 152 is a recurrent neural network, then program 150 utilizes a supervised training method. In another embodiment, the user may specify a training method to utilize, such as unsupervised or semi-supervised training.

Program 150 for standardizing disparate data points (step 204). Program 150 standardizes one or more disparate data points into one or more non-binary machine learning evaluation metrics utilizing a trained binary classification model. In an embodiment, program 150 standardizes disparate data points resulting from a plurality of conducted tests, as described in step 302, on a test input. In another embodiment, program 150 creates ones or more binary results based on the performed tests, as described in step 304. In another embodiment, program 150 generates one or more non-binary metrics based on the created binary results, as described in step 306. In various embodiments, program 150 converts the disparate data points into uniform machine learning evaluation metrics allowing a concise representation of mixed software and machine learning environments (e.g., applications, software, etc.). The standardization procedure (step 204) is further described and detailed in the flowchart and steps contained within FIG. 3.

Program 150 deploys test input (step 206). In an embodiment, program 150 deploys a test input (e.g., application, model, software, etc.) to a production environment or server. In another embodiment, program 150 determines which deployment environment to deploy a model out of a plurality of deployment environments (e.g., test, production, backup server, containers, or virtual machines). In an embodiment, program 150 utilizes the generated non-binary metrics from step 208 to determine whether to a deploy a test input. In this embodiment, program 150 may utilizes one or more thresholds or conditions to determine if a test input is sufficient to be deployed. For example, program 150 utilizes an accuracy threshold (e.g., 90% accuracy) to only deploy highly accurate test inputs to one or more production servers.

In an embodiment, program 150 generates a report containing the generated non-binary machine learning metrics. In various embodiments, program 150 constructs a document (e.g., downloadable document, spreadsheet, image, graph, etc.) containing the generated report and associated statistics. In this embodiment, the document is a tangible digitally or physical document (e.g., printed). In another embodiment, program 150 creates a visual representation the report, allowing a user to interact, add, modify, and/or remove one or more non-binary metrics. In yet another embodiment, program 150 presents one or more non-binary metrics on a graphical user interface or a web graphical user interface (e.g., generates hypertext markup language contained the generated results). Program 150 may output generated metrics into a plurality of suitable formats such as text files, HTML files, CSS files, JavaScript files, documents, spreadsheets, etc. In an embodiment, program 150 may transmit (e.g., notify) one or more notifications to one or more computing devices (not depicted) using a plurality of transmission methods including, but not limited to, short message service (SMS), email, push notification, automated phone call, text-to-speech, etc.

In the above embodiments, program 150 may generate, adjust, modify, transform, and/or present the appearance of a plurality of stylistic elements of the reports, generated web code, and notifications. In an embodiment, said plurality may include; adjustments to font, font size, character style (e.g., bold, italics, font color, background color, superscript, subscript, capitalization, etc.), general transparency, relative transparency, etc. For example, program 150 applies a "bold" adjustment to a low (e.g., bottom 25% percentile of a metric) non-binary metric. In another embodiment, program 150 applies an adjustment to all metrics that do not meet or exceed a predefined threshold. In various embodiments, program 150 adjusts one or more stylistics elements based on one or more generated non-binary machine learning evaluation metrics. For example, program 150 applies a red font to each metric out of a predefined acceptable range.

Figure 3:
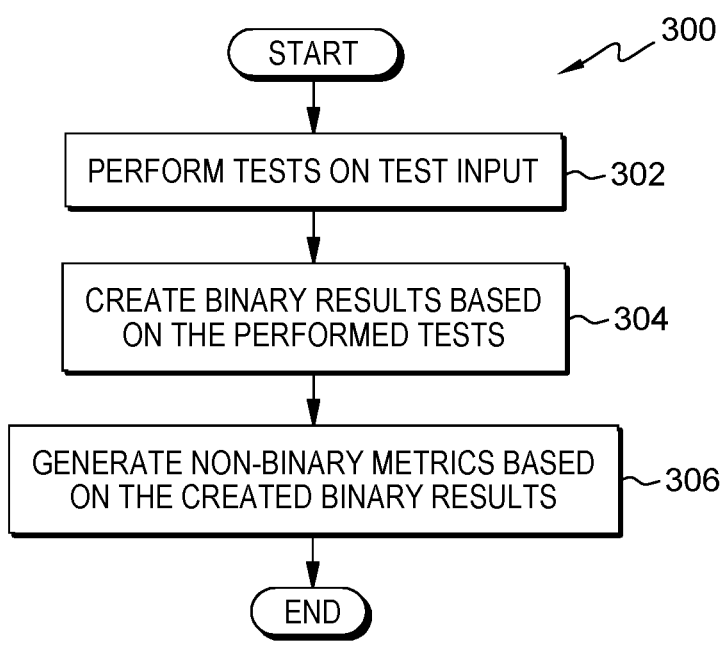
FIG. 3 is a flowchart depicting operational steps of a program, on a server computer within the computational environment of FIG. 1, for standardizing disparate data points into machine learning evaluation metrics, in accordance with an embodiment of the present invention.

FIG. 3 is a flowchart depicting operational steps of program 150 for converting test results containing disparate data points into machine learning evaluation metrics, in accordance with an embodiment of the present invention.

Program 150 performs tests on test input (step 302). Program 150 initiates, performs, and/or runs one or more tests on a test input. In an embodiment, program 150 performs one or more unit-tests where program 150 tests individual units or components (e.g., modules, functions, methods, classes, etc.) of a software. Here, program 150 validates that each unit of the software performs as designed. In an embodiment, program 150 utilizes "white-box" testing (i.e., clear box testing, transparent box testing, and structural testing) to verify the internal structures a program. In this embodiment, program 150 utilizes inputs to initiate paths through code and determine the appropriate outputs. In various embodiments, program 150 utilizes API testing, code coverage (e.g., creating tests to satisfy some criteria of code coverage), fault injection methods, mutation testing and static testing methods.

In another embodiment, program 150 measures test input (e.g., model performance and accuracy) and generates model performance data that includes, but is not limited to, predictive accuracy (e.g., Brier scores, Gini coefficients, discordant ratios, C-statistic values, net reclassification improvement indexes, receiver operating characteristics, generalized discrimination measures, Hosmer-Lemeshow goodness of fit values, etc.), error rates (e.g., root mean squared error (RMSE), mean absolute error, mean absolute percentage error, mean percentage error, etc.), precision, overfitting considerations, and generalized model fitness. Based on the type of the model, program 150 determines appropriate model performance methods and techniques (e.g., testing/validation algorithms, associated data types, features, and vectors) that best capture a predictive effectiveness of a model.

In an embodiment, program 150 utilizes "blackbox" testing methods to generate model statistics despite potential differences in input data, output data, training methods, and general model structure. In this embodiment, program 150 utilizes a plurality of testing and validation techniques and methods, such as model performance (e.g., cross validation), metamorphic testing (e.g., metamorphic relationship between input-output pairs), dual coding (e.g., utilizing the same features and data but training another type of model), coverage guided fuzzing, linear model comparisons, etc. In an embodiment, program 150 conducts multiple rounds of cross validation to assess a performance of a model, generate feedback data and statistics, and reduce a variance of the generated feedback data and statistics. In an embodiment, program 150 monitors system resources, generates system statistics (e.g., average/peak memory utilization, average/peak CPU utilization, average/peak GPU utilization, storage utilization, runtimes (e.g., execution runtimes and model utilization runtimes).

Program 150 creates binary results based on performed tests (step 304). Responsive to program 150 performing one or more tests on the test input, program 150 creates one or more binary results (i.e., data points) utilizing the results from the performed one or more tests, according to one or more binary classification techniques. In this embodiment, the results contain one or more disparate data points with differing unit types, magnitudes, purposes, and structure. Program 150 utilizes a binary classifier to classify the tests and associated generated statistics (e.g., model performance data), as binary values. Program 150 utilizes the binary classifier to separate elements of a dataset (e.g., results from tests performed in step 204, etc.) into two or more groupings or sets, such as pass sets and fail sets. In various embodiments, the results from the performed tests contain one or more binary sets (e.g., pass/fail, true/false sets).

In another embodiment, the performed tests contain non-binary results such as weighted results, normalized results, performance data (e.g., CPU utilized, etc.), continuous value results, and every result that cannot be represented in two values (e.g., two classifications or categories). In this embodiment, program 150 may utilize the following binary classification techniques: decision trees, random forests, Bayesian networks, support vector machines, neural networks, and logistic regression. In various embodiments, program 150 creates disparate data points containing a plurality of non-binary and binary test results. For example, program 150 tests an application that contains one or model deep learning models. In this embodiment, program 150 runs a plurality of tests, on the application as a whole and specific tests evaluating the effectiveness of the contained model, resulting in a plurality of data points (i.e., test results) lacking standardization, uniformity, and generalized structures.

In various embodiments, program 150 utilizes one or more thresholds to determine one or more binary values for one or more non-binary values or sets. For example, program 150 sets an application test execution threshold of 15 minutes, where if the application fails to execute and finish one or more tests before the threshold of 15 minutes then program 150 classifies said test as failed, alternatively any value under 15 minutes is classified as a pass or success. In an embodiment, program 150 may utilize a plurality of models to dynamically adjust one or more thresholds and associated values. In an embodiment, the user specifies the threshold type and/or value. In other embodiments, production server requirements dictate threshold type and/or value. For example, an exemplary production server may have a critical requirement for a highly efficient application (e.g., fewer than 10 errors, execute in a specific temporal period, etc.). In this example, program 150 adjusts one or more thresholds to stricter values (e.g., more restrictive) to effectuate the requirement for a highly efficient application as required by the production server.

Program 150 generates non-binary metrics based on the created binary results (step 306). Responsive to program 150 creating one or more binary results, program 150 aggregates and generates one or more non-binary machine learning evaluation metrics based on the binary results (i.e., standardized disparate data points). In an embodiment, non-binary machine learning evaluation metrics include (e.g., selected from the group consisting of), but are not limited to, precision, recall, accuracy, precision by label, recall by label, F1-measure by label, hamming loss, subset accuracy, F1 measure, micro precision, micro recall, and micro F1 measure. In various embodiments, program 150 predicts test results as true, pass, or "1" where "1" indicates a passed test and "0" indicates a failed test. In an example scenario, program 150 performs 3 tests (e.g., test set) on a test input (e.g., model), where 2 tests pass and 1 fail. In this scenario, program 150 predicts that every test has passed and calculates that said test set has an accuracy of 0.6, average precisions of 1, and a F1 score of 0.8.

Figure 4:
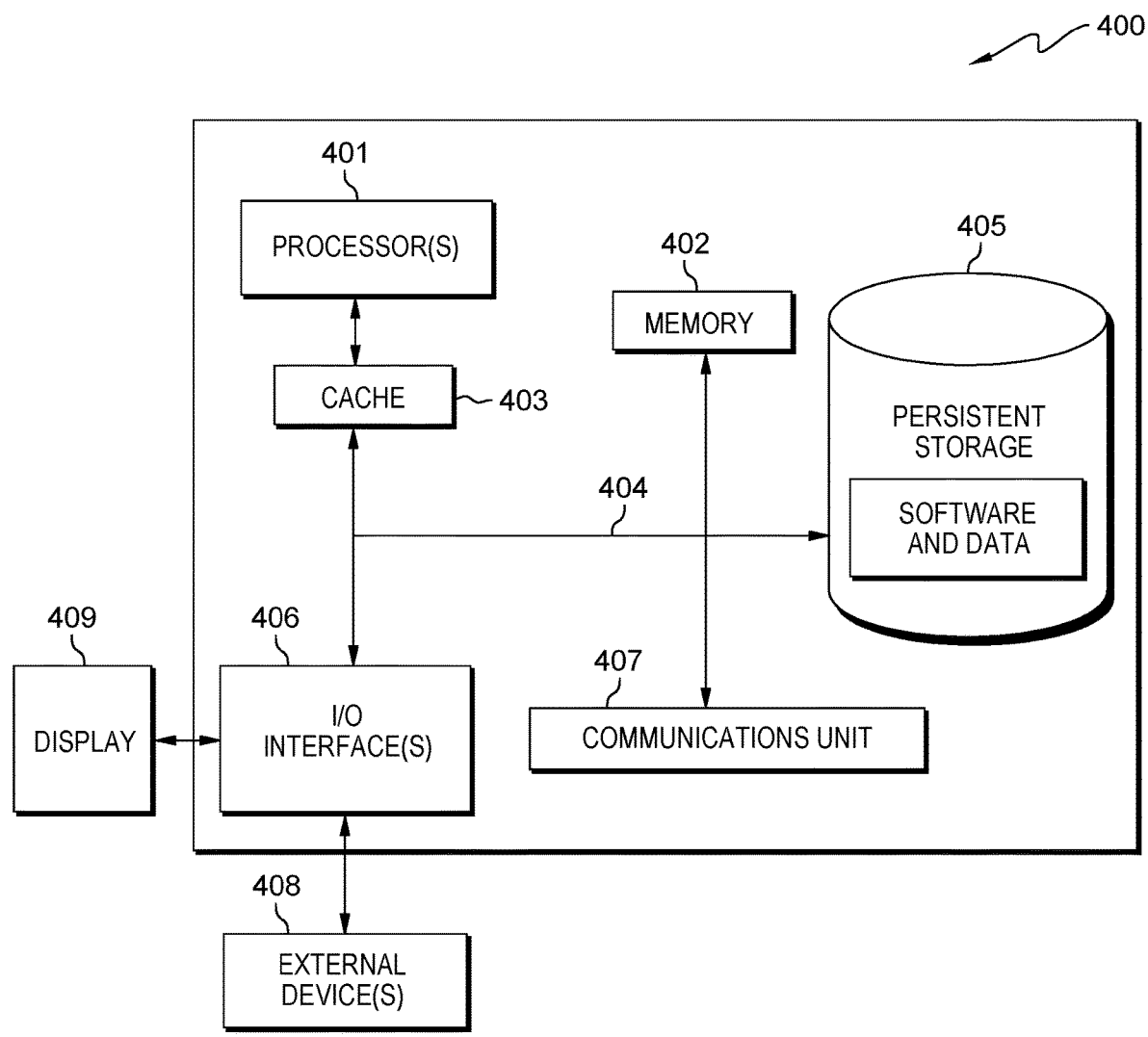
FIG. 4 is a block diagram of components of the server computer, in accordance with an embodiment of the present invention.

FIG. 4 depicts a block diagram of components of server computer 120 in accordance with an illustrative embodiment of the present invention. It should be appreciated that FIG. 4 provides only an illustration of one implementation and does not imply any limitations with regard to the environments in which different embodiments may be implemented. Many modifications to the depicted environment may be made.

Server computer 120 each include communications fabric 404, which provides communications between cache 403, memory 402, persistent storage 405, communications unit 407, and input/output (I/O) interface(s) 406. Communications fabric 404 can be implemented with any architecture designed for passing data and/or control information between processors (such as microprocessors, communications, and network processors, etc.), system memory, peripheral devices, and any other hardware components within a system. For example, communications fabric 404 can be implemented with one or more buses or a crossbar switch.

Memory 402 and persistent storage 405 are computer readable storage media. In this embodiment, memory 402 includes random access memory (RAM). In general, memory 402 can include any suitable volatile or non-volatile computer readable storage media. Cache 403 is a fast memory that enhances the performance of computer processor(s) 401 by holding recently accessed data, and data near accessed data, from memory 402.

Program 150 may be stored in persistent storage 405 and in memory 402 for execution by one or more of the respective computer processor(s) 401 via cache 403. In an embodiment, persistent storage 405 includes a magnetic hard disk drive. Alternatively, or in addition to a magnetic hard disk drive, persistent storage 405 can include a solid-state hard drive, a semiconductor storage device, a read-only memory (ROM), an erasable programmable read-only memory (EPROM), a flash memory, or any other computer readable storage media that is capable of storing program instructions or digital information.

The media used by persistent storage 405 may also be removable. For example, a removable hard drive may be used for persistent storage 405. Other examples include optical and magnetic disks, thumb drives, and smart cards that are inserted into a drive for transfer onto another computer readable storage medium that is also part of persistent storage 405.

Communications unit 407, in these examples, provides for communications with other data processing systems or devices. In these examples, communications unit 407 includes one or more network interface cards. Communications unit 407 may provide communications through the use of either or both physical and wireless communications links. Program 150 may be downloaded to persistent storage 405 through communications unit 407.

I/O interface(s) 406 allows for input and output of data with other devices that may be connected to server computer 120. For example, I/O interface(s) 406 may provide a connection to external device(s) 408, such as a keyboard, a keypad, a touch screen, and/or some other suitable input device. External devices 408 can also include portable computer readable storage media such as, for example, thumb drives, portable optical or magnetic disks, and memory cards. Software and data used to practice embodiments of the present invention, e.g., program 150, can be stored on such portable computer readable storage media and can be loaded onto persistent storage 405 via I/O interface(s) 406. I/O interface(s) 406 also connect to a display 409.

Display 409 provides a mechanism to display data to a user and may be, for example, a computer monitor.

The programs described herein are identified based upon the application for which they are implemented in a specific embodiment of the invention. However, it should be appreciated that any particular program nomenclature herein is used merely for convenience, and thus the invention should not be limited to use solely in any specific application identified and/or implied by such nomenclature.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, conventional procedural programming languages, such as the "C" programming language or similar programming languages, and quantum programming languages such as the "Q" programming language, Q#, quantum computation language (QCL) or similar programming languages, low-level programming languages, such as the assembly language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A computer-implemented method comprising:
   performing, by one or more computer processors, one or more tests on a test input resulting in one or more disparate data points that are non-binary;
   standardizing, by one or more computer processors, the one or more disparate data points utilizing a trained binary classification model into binary machine learning evaluation metrics comprising a concise representation of mixed software and machine learning environments;
   generating, by one or more computer processors, one or more non-binary machine learning evaluation metrics based on the one or more standardized disparate data points; and
   responsive to the one or more generated non-binary machine learning evaluation metrics exceeding one or more thresholds, deploying, by one or more computer processors, the test input, wherein the one or more thresholds are adjusted based on deployment requirements.

2. The method of claim 1, wherein standardizing the one or more disparate data points utilizing the trained binary classification model, comprises:
   classifying, by one or more computer processors, one or more non-binary disparate data points according to a binary classification technique and the trained binary classification model.

3. The method of claim 1, wherein the non-binary machine learning evaluation metrics include at least one metric selected from a group consisting of precision, recall, accuracy, precision by label, recall by label, F1-measure by label, hamming loss, subset accuracy, F1 measure, micro precision, micro recall, and micro F1 measure.

4. The method of claim 1, further comprising:
   generating, by one or more computer processors, a report containing the generated non-binary machine learning evaluation metrics.

5. The method of claim 4, further comprising:
   notifying, by one or more computer processors, one or more users with the generated report.

6. The method of claim 4, further comprising:
   presenting, by one or more computer processors, the generated report on a web user graphical interface.

7. The method of claim 4, further comprising:
   adjusting, by one or more computer processors, one or more stylistic elements associated with the generated report.

8. The method of claim 1, wherein the test input is a software.

9. The method of claim 8, wherein the software contains one or more deep learning models.

10. A computer program product comprising:
    one or more computer readable storage media and program instructions stored on the one or more computer readable storage media, the stored program instructions comprising:
    program instructions to perform one or more tests on a test input resulting in one or more disparate data points that are non-binary;
    program instructions to standardize the one or more disparate data points utilizing a trained binary classification model into binary uniform machine learning evaluation metrics comprising a concise representation of mixed software and machine learning environments;
    program instructions to generate one or more non-binary machine learning evaluation metrics based on the one or more standardized disparate data points; and
    program instructions to, responsive to the one or more generated non-binary machine learning evaluation metrics exceeding one or more thresholds, deploy the test input, wherein the one or more thresholds are adjusted based on deployment requirements.

11. The computer program product of claim 10, wherein the program instructions, to standardize the one or more disparate data points utilizing the trained binary classification model, comprise:
  program instructions to classify one or more non-binary disparate data points according to a binary classification technique and the trained binary classification model.

12. The computer program product of claim 10, wherein the non-binary machine learning evaluation metrics include at least one metric selected from a group consisting of precision, recall, accuracy, precision by label, recall by label, F1-measure by label, hamming loss, subset accuracy, F1 measure, micro precision, micro recall, and micro F1 measure.

13. The computer program product of claim 10, wherein the program instructions, stored on the one or more computer readable storage media, comprise:
  program instructions to generate a report containing the generated non-binary machine learning evaluation metrics.

14. The computer program product of claim 13, wherein the program instructions, stored on the one or more computer readable storage media, comprise:
  program instructions to notify one or more users with the generated report.

15. The computer program product of claim 14, wherein the program instructions, stored on the one or more computer readable storage media, comprise:
  program instructions to present the generated report on a web user graphical interface.

16. A computer system comprising:
  one or more computer processors;
  one or more computer readable storage media; and
  program instructions stored on the computer readable storage media for execution by at least one of the one or more processors, the stored program instructions comprising:
    program instructions to perform one or more tests on a test input resulting in one or more disparate data points that are non-binary;
    program instructions to standardize the one or more disparate data points utilizing a trained binary classification model into binary uniform machine learning evaluation metrics comprising a concise representation of mixed software and machine learning environments;
    program instructions to generate one or more non-binary machine learning evaluation metrics based on the one or more standardized disparate data points; and
    program instructions to, responsive to the one or more generated non-binary machine learning evaluation metrics exceeding one or more thresholds, deploy the test input, wherein the one or more thresholds are adjusted based on deployment requirements.

17. The computer system of claim 16, wherein the program instructions, to standardize the one or more disparate data points utilizing the trained binary classification model, comprise:
  program instructions to classify one or more non-binary disparate data points according to a binary classification technique and the trained binary classification model.

18. The computer system of claim 16, wherein the non-binary machine learning evaluation metrics include at least one metric selected from a group consisting of precision, recall, accuracy, precision by label, recall by label, F1-measure by label, hamming loss, subset accuracy, F1 measure, micro precision, micro recall, and micro F1 measure.

19. The computer system of claim 16, wherein the program instructions, stored on the one or more computer readable storage media, comprise:
  program instructions to generate a report containing the generated non-binary machine learning evaluation metrics.

20. The computer system of claim 19, wherein the program instructions, stored on the one or more computer readable storage media, comprise:
  program instructions to notify one or more users with the generated report.

* * * * *